(12) United States Patent
Gadde (10) Patent No.: US 12,547,429 B2
(45) Date of Patent: Feb. 10, 2026

(54) VISUAL PLANNING AND ASSIGNMENT OF CLOUD-BASED COMPUTING RESOURCES

(71) Applicant: Salesforce, Inc., San Francisco, CA (US)

(72) Inventor: Apuroop Gadde, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 466 days.

(21) Appl. No.: 18/103,425

(22) Filed: Jan. 30, 2023

(65) Prior Publication Data

US 2024/0256299 A1 Aug. 1, 2024

(51) Int. Cl.
*G06F 9/451* (2018.01)
*G06F 9/50* (2006.01)

(52) U.S. Cl.
CPC .......... *G06F 9/451* (2018.02); *G06F 9/5055* (2013.01)

(58) Field of Classification Search
CPC ..... G06F 9/451; G06F 9/5055; G06Q 10/063; G06Q 30/0201; G06Q 30/0611; G06Q 30/0623; G06Q 30/0633; G06Q 30/0645; G06Q 50/50
See application file for complete search history.

(56) References Cited

U.S. PATENT DOCUMENTS

| 8,930,274 | B1 * | 1/2015 | Brickell | G06Q 20/40 705/67 |
| 10,523,591 | B2 * | 12/2019 | Pogrebinsky | H04L 47/822 |
| 2014/0278808 | A1 * | 9/2014 | Iyoob | G06Q 30/0206 705/7.35 |
| 2016/0019636 | A1 * | 1/2016 | Adapalli | G06Q 30/0635 705/26.81 |

* cited by examiner

*Primary Examiner* — Gregory A Kessler
(74) *Attorney, Agent, or Firm* — Butzel Long (57) ABSTRACT

A computer-implemented method for providing user interfaces is disclosed. The method includes requesting transaction-specific information for a cloud service resource offered by a cloud server application. The requesting causes the cloud server application to send the transaction-specific information that indicates the resources required to access the cloud service resource. The method also includes receiving the transaction-specific information from the cloud server application, and providing a platform-specific application programming interface (API) that identifies a part of the transaction-specific information as applicable for a resource utilization criterion related to the cloud service resource. The resource utilization criterion includes an availability in a geographical region, a resource size preference of a target user, and a resource category preference of the target user. The method further includes selecting and displaying only the identified part of the transaction-specific information to the target user.

9 Claims, 7 Drawing Sheets

Cloud service resource AAA

Related Details

Price Id
FPRI-020855 — 104
Catalog Item
m5d.large — 106
Region
Asia Pacific (Mumbai) — 108
Platform
Linux — 112

Currency
USD - U.S. Dollar — 114
Price Type
OnDemand — 118
Unit Price ⓘ — 122
0.12200

| Related | Details |

Cloud service resource BBB

ITSM_TP_CatalogItem Name
m5d.large — 132                  Cloud Provider
                                  AWS — 142
ITSM Catalog
Public Cloud Catalog — 134        Cloud Category
                                  General purpose — 144
Item Type
VM — 136

∨ Specifications vCPU                              Memory in GiB
2 — 138                           8.00 — 146

VISUAL PLANNING AND ASSIGNMENT OF CLOUD-BASED COMPUTING RESOURCES

BACKGROUND

Existing methods for cloud service resource planning, ordering and costing are mostly manual. Budget and resource planning teams typically request resource items and provide relevant price and other information in spreadsheets. Costing and ordering teams, at their end, manually check for availability of the items over preferred regions and preferred categories, and use the spreadsheet data to manually plan, assign cloud-based computing resources and compute the costs associated. This process results in inefficient utilization of time and human resources and frequent errors and rework.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description explain the principles of implementations of the disclosed subject matter. No attempt is made to show structural details in more detail than can be necessary for a fundamental understanding of the disclosed subject matter and various ways in which it can be practiced.

DETAILED DESCRIPTION

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure can be practiced without these specific details, or with other methods, components, materials, or the like. In other instances, well-known structures and devices are shown in block diagram form to facilitate describing the subject disclosure.

The present disclosure provides systems, methods, and graphical user interfaces (GUIs) for visual planning, assignment, ordering and costing of cloud service resources. Existing methods for provisioning cloud services are mostly manual. Budget and resource planning teams typically request resource items and provide relevant price and other information in spreadsheets. Costing and ordering teams, at their end, manually check for availability of the items over preferred regions and preferred categories, and use the spreadsheet data to manually compute the costs associated. This process results in inefficient utilization of time and human resources and frequent errors and rework.

Various implementations of the disclosed subject matter may provide techniques and interfaces that automate and improve on the manual process of listing and costing cloud service resources. For all to-be-requested cloud service resources, the GUI checks internally and limits the displayed selection options to only those that are valid or available. Further, the GUI applies the relevant operating expense algorithms and computes the cost of the resource items to be ordered. The GUI displays all resource related information, such as, cloud service provider, cloud service category, resource identification number, memory usage specification, and computed cost, in preferred viewing formats. The client-side application periodically synchronizes with the server-side application and ensures that the GUI displays up-to-date information.

In an aspect of the disclosed subject matter, a computer-implemented method is disclosed for providing user interfaces. The method may include requesting, from a cloud server application, transaction-specific information for a cloud service resource offered by the cloud server application. The requesting causes the cloud server application to send the transaction-specific information that indicates the resources required to access the cloud service resource.

As used herein, "Transaction-specific information" refers to data related to and characterizing past or present or future transactions involving a cloud service resource offered by a cloud server application. For example, for transactions such as purchase, sale, rental and lease of a cloud service resource, a Virtual Machine (VM), offered by a cloud server application, Amazon Web Services (AWS), the transaction-specific information may include information on the geographical regions where the VM is available, the cloud platforms over which the VM is available, the catalog items the VM is listed as, the price identification numbers related to the VM and the like.

The method may also include receiving the transaction-specific information from the cloud server application, and providing a platform-specific application programming interface (API) that identifies a part of the transaction-specific information as applicable for a resource utilization criterion related to the cloud service resource, wherein the resource utilization criteria includes an availability in a geographical region, a resource size preference of a target user, and a resource category preference of the target user.

The method may further include selecting only the identified part of the transaction-specific information for displaying to the target user, and displaying the identified part of the transaction-specific information to the target user.

The computer-implemented method may further include converting the transaction-specific information received from the cloud server application into resource records including data fields corresponding to properties of the cloud service resource, wherein the properties include a cloud service provider, a cloud service category, a resource item number, and a memory usage specification of the resource.

The computer-implemented method may also include storing the transaction-specific information received from the cloud server application into web objects that store the transaction-specific information.

The computer-implemented method may further include periodically synchronizing with the cloud server application to update the transaction-specific information for the cloud service resource.

The computer-implemented method may also include providing a user interface via client-side web components and requesting the cloud service resource via the user interface, wherein the user interface provides options to the target user for selecting the cloud service resource and corresponding resource utilization criterion.

The computer-implemented method may further include computing operating expenses of the cloud service resource transacted over a predetermined period of time, based on the transaction-specific information and displaying a computed operating expense value to the target user.

In an aspect of the disclosed subject matter, a system is disclosed providing graphical user interfaces. The system may include a computer processor configured to run a web client application digitally connected with the computer processor. The web client application includes resource records that include data fields corresponding to properties of a cloud service resource offered by a cloud server application, and web objects that store a transaction-specific information for the cloud service resource. The system may also include a non-transitory machine-readable storage medium that provides instructions that are configurable to cause the apparatus to perform any of the methods disclosed herein.

In an aspect of the disclosed subject matter, a non-transitory machine-readable storage medium is disclosed that provides instructions that, if executed by a processor, are configurable to cause said processor to perform operations and methods for securing a web application interface as disclosed herein.

Figure 1A:
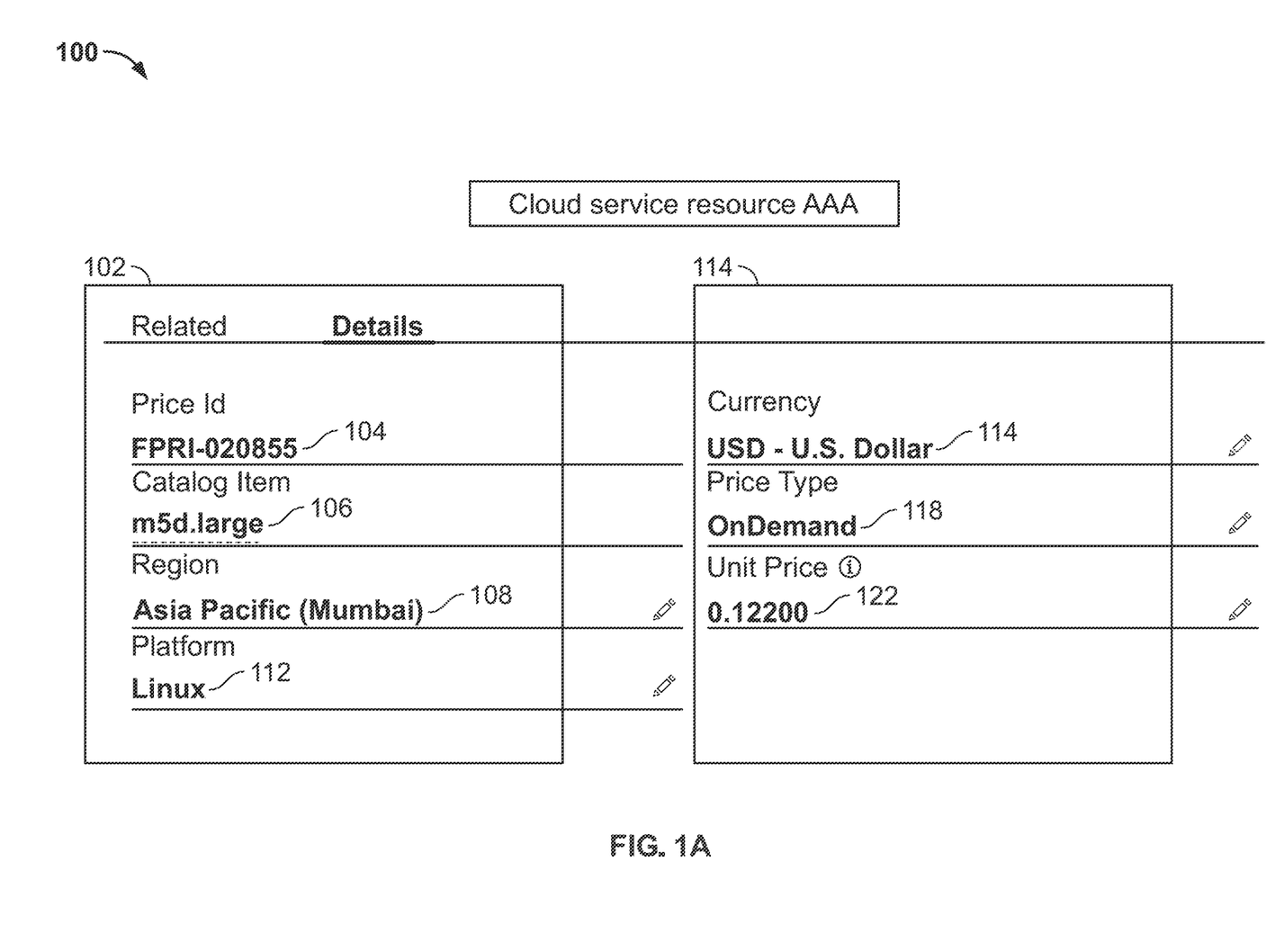
FIG. 1A is a block diagram illustrating an example resource record of a standard cloud service resource.

FIG. 1A is a block diagram illustrating an example resource record 100 that includes data fields related to an example cloud service resource AAA. Cloud service resources are cloud-based computing resources ordered from cloud service providers, such as Amazon Web Services (AWS). Google Cloud Platform (GCP), and Azure. Example cloud service resources are Virtual Machine (VM). Relational Database Service (RDS). Simple Storage Service (S3) Glacier. Elastic Kubernetes Service (EKS), Elastic Block Store (EBS) Provisioned Input/Output Operations per Second (Piops) and the like. Generally, any service or feature that users of a cloud-based system may use in their own programs and systems, which is provided by the cloud-based system, may be managed as a cloud service resource as disclosed herein.

Costing and budgeting teams in business organizations typically perform their planning, assignment, ordering and costing of cloud service resources based on transaction-specific information. Referring to FIG. 1A, an example transaction-specific information group 102 includes several data fields related to transactions involving the cloud service resource AAA. In this instance, transaction-specific information group 102 includes price identification number 104, catalog item 106, region 108, and platform 112.

As used herein, a "price" of a resource may refer to the actual cost of the resource, which may be linked directly to an amount of cloud system computing resources needed to provide the resource. For example, the price of a storage component may be given relative to the amount of storage consumed or used, typically within a given time period, such as $0.05/GB/day. In another instance, the price of a computing resource such as a Virtual Machine (VM) may be calculated based on the number of hours the VM is used for, over a month. Accordingly, managing a "price" of a cloud system resource necessarily ties to, and affects, management of the underlying computing resources required to provide the priced resource. As a result, the "price" or cost of a resource may be used as a direct proxy for the amount of computing resources needed to provide the cloud resource.

Planning, assignment, ordering and costing of the cloud service resources also depend on resource utilization criteria of the cloud service resources, i.e., a group of variables that characterize procurement, deployment and utilization of the cloud service resources. Continuing to refer to FIG. 1A, an example resource utilization criteria group 114 includes a number of data fields that relate to utilization criteria for the cloud service resource AAA. In this instance, the resource utilization criteria group 114 includes currency 116, price type 118, unit price 122 and the like.

The data field region 108 may include several geographical regions where the resource may be used. The data field platform 112 may include several options, such as Windows and Linux. The data field price type 118 may include several textual options such as 'OnDemand' and 'Reserved-3-Year-Convertible-No-Upfront'.

Figure 1B:
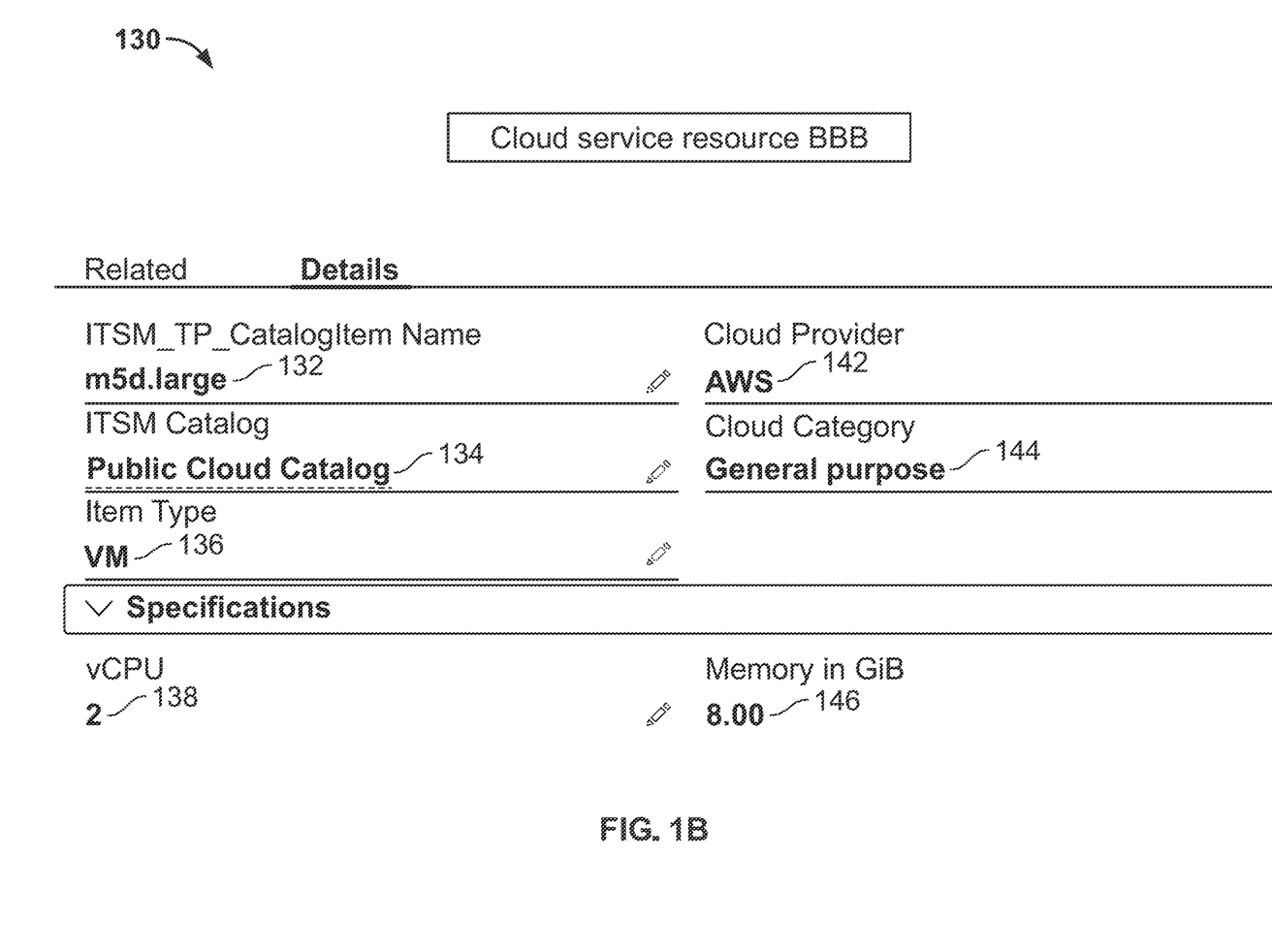
FIG. 1B is a block diagram illustrating an example resource record of a standard cloud service resource.

FIG. 1B is a block diagram illustrating an example resource record 130 that includes data fields related to several properties of an example cloud service resource BBB. The properties of the cloud service resources describe, define and characterize the cloud service resources. In this instance, example properties of the cloud service resource BBB include catalog item name 132, catalog name 134, item type 136, cloud service resource item number or specification 138, cloud service provider 142, cloud service category 144, and a technical specification such as memory usage specification 146 of the resource.

"Catalog item name", as used herein, may indicate the name by which a specific cloud service resource is listed in a catalog of resources. Catalog item name 132 may be alpha-numeric and/or descriptive phrases, such as 'm5d.large', 'b5c.small' and the like.

"Catalog name" may indicate the name by which a specific catalog is indexed in a database of services provided by a cloud server application. Catalog name 134 may be alpha-numeric and/or descriptive phrases, such as 'Public cloud catalog #4', 'Security product catalog' and the like.

"Item type" may indicate the type of cloud service resource that is listed in a catalog of resources. Item type 136 may be descriptive phrases, such as 'Virtual Machine' or 'VM,' 'Relational Database Service' or 'RDS', 'Simple Storage Service' or 'S3', 'Elastic Block Store' or 'EBS' and the like.

"Cloud service resource item number or specification" may indicate the alpha-numeric reference number by which a resource is listed in a catalog of resources. Cloud service resource item number or specification 138 may be alpha-numeric and/or descriptive phrases, such as "vCPU", 'EBS' and the like, and may include the associated quantity required of such items, expressed numerically as '2', '4' and the like.

"Cloud service provider" may indicate the names of the third-party organizations that provide the cloud service resources. Cloud service provider 142 may be textual phrases, such as 'Amazon Web Services' or 'AWS', 'Google Cloud Platform' or 'GCP', Azure and the like.

"Cloud service category" may indicate the categories of a cloud service resource as described by a cloud service provider. Cloud service category 144 may include descriptive phrases, such as 'Compute optimized', 'Field-Programmable Gate Array (FPGA) instances', 'Graphics processing unit (GPU) instances', and 'General purpose'.

"Memory usage specification" may indicate the amount of memory the cloud-based system may require or set aside for providing the requested resource. Memory usage specification 146 may be expressed in Gibibytes (GiB) units.

Figure 1C:
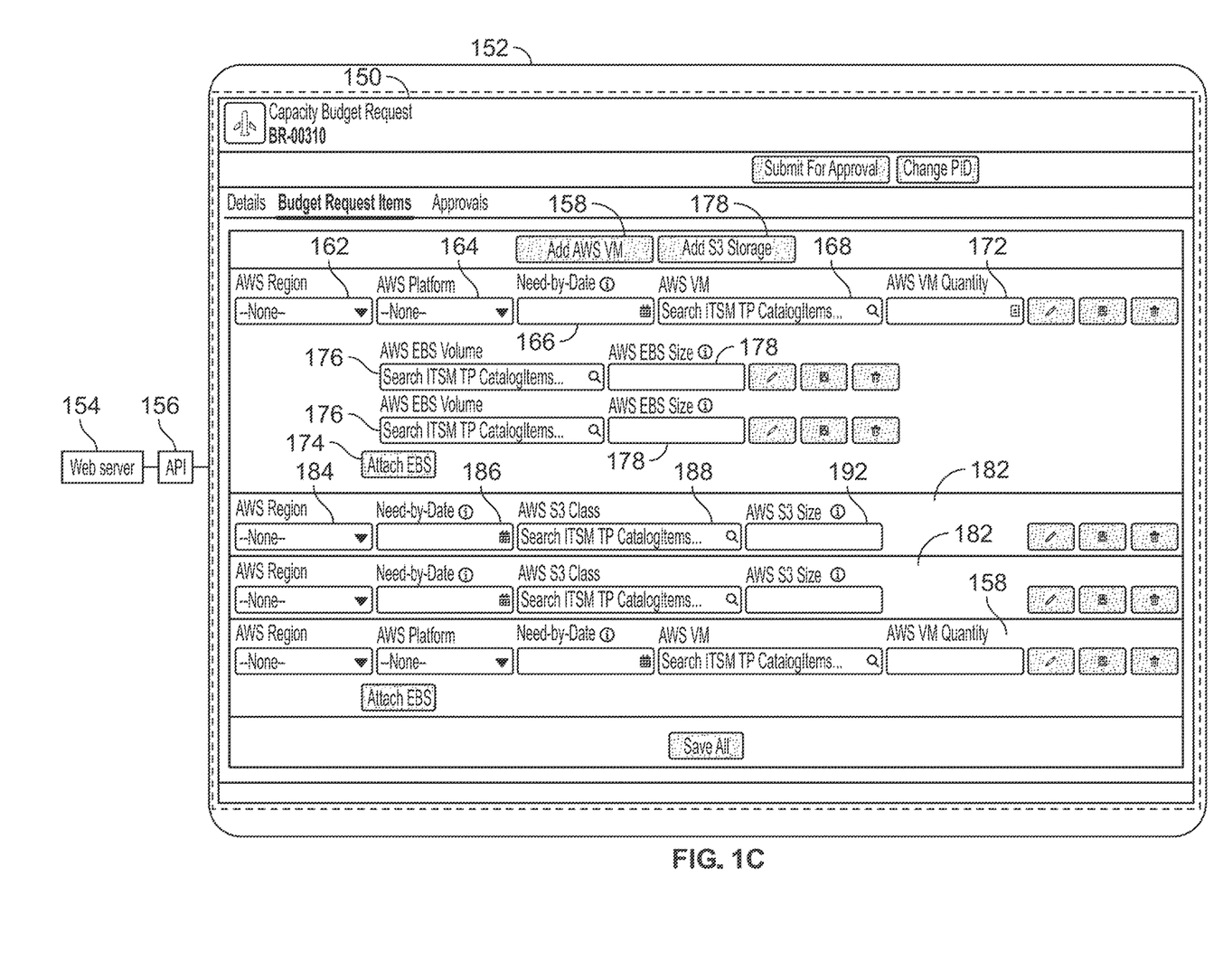
FIG. 1C is a block diagram illustrating a user interface provided for visual planning and assignment of cloud service resources.

FIG. 1C is a block diagram illustrating a user interface 150 provided for visual planning and assignment of the cloud service resources. The user interface 150 provides options for displaying valid field data to target users and for selecting a desired cloud service resource and corresponding resource utilization criterion referred to in FIGS. 1A and 1B.

A "target user", as used herein, indicates an authorized user accessing various data fields on the user interface 150 with appropriate field-specific access privileges. For example, a regular user logged in as a target user, may have 'view only' access to the price of a particular cloud service resource. A purchase manager, on the other hand, logged in as a target user, may have 'view and edit' access to the price of the same cloud service resource.

"Valid" field data, as used herein, indicates all possible choices that are actually available to a target user. Put another way, the valid field data exclude all non-available and non-valid options, and display only the available options, such as regions where a particular cloud service resource is available, database editions that are available for the cloud service resource, price types that are available for the cloud service resource and the like.

Referring to FIG. 1C, the user interface 150 is hosted on a web client application 152 via client-side web components. The web client application 152 communicates with a web server application 154 via an application programming interface (API) 156 specifically programmed for the web server application 154. The API 156 sources the necessary data from the web server application 154 and displays the data on the user interface 150 in accordance with a business logic explained in detail below:

Referring to the user interface 150, there may be an example cloud service resource 158 that may be planned for by providing procurement or sourcing specifications via several related selection options, as displayed and available on the user interface 150. For example, there is a geographical region option 162, a cloud server platform option 164, a need-by-date option 166, an actual resource name option 168, and a needed quantity option 172.

In an aspect, there is an option to include a sub-resource 174 for the example resource 158. There are several selection options for the sub-resource 174, as displayed and available on the user interface 150. For example, there is a volume of the sub-resource option 176, and a size of the sub-resource option 178.

In an instance, there may be a second web server resource 182 (BBB, for example) that may be planned for and ordered based on the selection options displayed and provided on the user interface 150. For example, there is a region selection option 184, a need-by-date option 186, a class description option 188, and a size description option 192.

In operation, the cloud client application 152 hosts the user interface 150 and requests the cloud server application 154 for the transaction-specific information 102 (FIG. 1A) for a cloud service resource 182 (BBB, for example) offered by the cloud server application 152. The requesting causes the cloud server application 154 to send the transaction-specific information 102 (FIG. 1A). The cloud client application 152 receives the transaction-specific information 102 (FIG. 1A), stores the information into web objects and maintains the information up-to-date by periodically synchronizing with the cloud server application 152.

Referring to FIG. 1C, the platform-specific application programming interface (API) 156 identifies a part of the transaction-specific information 102 (FIG. 1A) as applicable for a resource utilization criterion 114 (FIG. 1A). The information is processed at the end user's device and only the identified part of the transaction-specific information 102 (FIG. 1A) is selected for displaying to a target user. Accordingly, the identified part of the transaction-specific information 102 (FIG. 1A) is displayed to the target user, using the user interface 150, eliminating all possible choices that are not valid or applicable. For example, if a user selects a particular cloud service resource, the user interface 150 filters out all non-available and non-valid options and displays only those regions where the cloud service resource is available, and only those database editions and those price types that are available for the cloud service resource.

In an aspect, operating expenses of the cloud service resource, as transacted over a period of time, are computed, based on the transaction-specific information. Referring back to FIG. 1C, the platform-specific API 156 provides the pricing for a set of cloud service resources in a particular region or across multiple regions. Generally, a platform-specific API or other component refers to a component that is specific to a single cloud-based system and provides functionality only for that platform. The API 156 may provide specific pricing for the cloud service resources based on corresponding platform, database engine, database edition information. The pricing data are kept up-to-date by periodically synchronizing with source data on the cloud server application 154 provided via JSON files or other file-based updates, an API provided by the cloud server system, or the like. Finally, a computed operating expense value is displayed to the target user. Based on the target user's access privileges, the user may accept or reject or modify or simply view the operating expense values.

Example operating expenses (Opex) calculation formulas, as operationalized by the system of FIGS. 1A, 1B, and 1C are given below. These formulas are useful for infrastructure costing teams to appropriately approve or reject budget requests for cloud service resources. In these examples, several cloud service resources are priced out in different regions for infrastructure budgeting purposes. These calculations are based on the assumption that the average the number of days per month is 30.5 days.

The first calculation, for example, provides the total monthly cost to provide a first resource that is priced hourly. The second calculation provides the total monthly cost to provide a second resource with a variable price based on monthly storage units measured in GiB. The third calculation provides the total monthly cost to provide a third resource that is offered on a 'On demand and reserved for one year with no upfront payment' scheme and priced hourly.

The fourth calculation provides the total monthly cost to provide a fourth resource that is offered on a 'Reserved for 3 year with a partial upfront payment' scheme and priced hourly. The price for the first month includes a one-time upfront fee and the cost of usage based on the number of hours the resource is used for. The monthly price for the remaining months, under this scheme, is only the cost of usage based on the number of hours the resource is used for.

The fifth calculation provides the total monthly cost to provide a fifth resource that is priced based on the number of units of the resource used and the number of hours the resource is used for.

The sixth calculation provides the total monthly cost to provide a sixth resource that is offered, for example, on a 'X Units free usage and unit-wise pricing above X units' scheme. In an instance, the number of free units may be 3000 and the monthly price is (number of units above 3000) times the unit price of the resource.

The seventh calculation provides the total monthly cost to provide a seventh resource that is offered on a unit-wise pricing scheme. The pricing, in this case, may have multiple tiers based on the number of units used.

The eighth calculation provides the total monthly cost to provide an eighth resource that is, like the second resource, offered on a variable price based on monthly storage units, measured in GiB.

For Cloud Service Resource1 (Resource1):

Opex Per Month=(Price of Resource1 Per Hour)
 *Quantity*30.5 (Days)*24 (Hours)

For Cloud Service Resource2 (Resource2):

Opex per month=(Price per unit storage of
 Resource2 per Month)*storage of Resource2 in GiB For Cloud Service Resource3, On-Demand and Reserved-1-Year-No Upfront:

Opex per month=(Price of Resource3 per hour)
 *quantity*30.5 (days)*24 (hours)

For Cloud Service Resource4, Reserved-3 Year-Partial Upfront:

Opex per month for first month=Upfront fee+(Price
 of Resource4 per hour)*quantity of
 Resource4*30.5 (days)*24 (hours)

Opex for remaining months=(Price of Resource4 per
 hour)*quantity*30.5 (days)*24 (hours)

For Cloud Service Resource5:

Opex per month=(Price of one unit of Resource5 per
 hour)*Number of units of Resource5*30.5
 (days)*24 (hours)

For Cloud Service Resource6:

Opex per month=3,000 units free and (Price of one
 unit of Resource6 per month)*Number of units
 of Resource6 over 3000

For Cloud Service Resource7:

Opex per month=(Price of one unit of Resource6 per
 month)*Number of units of Resource7

For Cloud Service Resource8:

Opex per month=(Price per GiB storage of
 Resource8 per Month)*storage of Resource8

Additionally, a mark-up such as 5%, 10%, or a flat amount may be added to the Opex to account for miscellaneous costs during deployment.

Data security of the pricing and other sensitive information is ensured by assigning appropriate accessing, viewing and editing privileges to regular users, financial administrators, and people managers in the organization.

The resource records of FIGS. 1A and 1B, and the user interface 150 of FIG. 1C provide a one-stop, one-page visual planning, costing and assignment solution that helps the organizational save human and financial resources. The elimination of non-applicable, non-valid options and the automation in calculations reduce manual errors and increase the speed and agility of the approval process for budget requests.

Figure 2A:
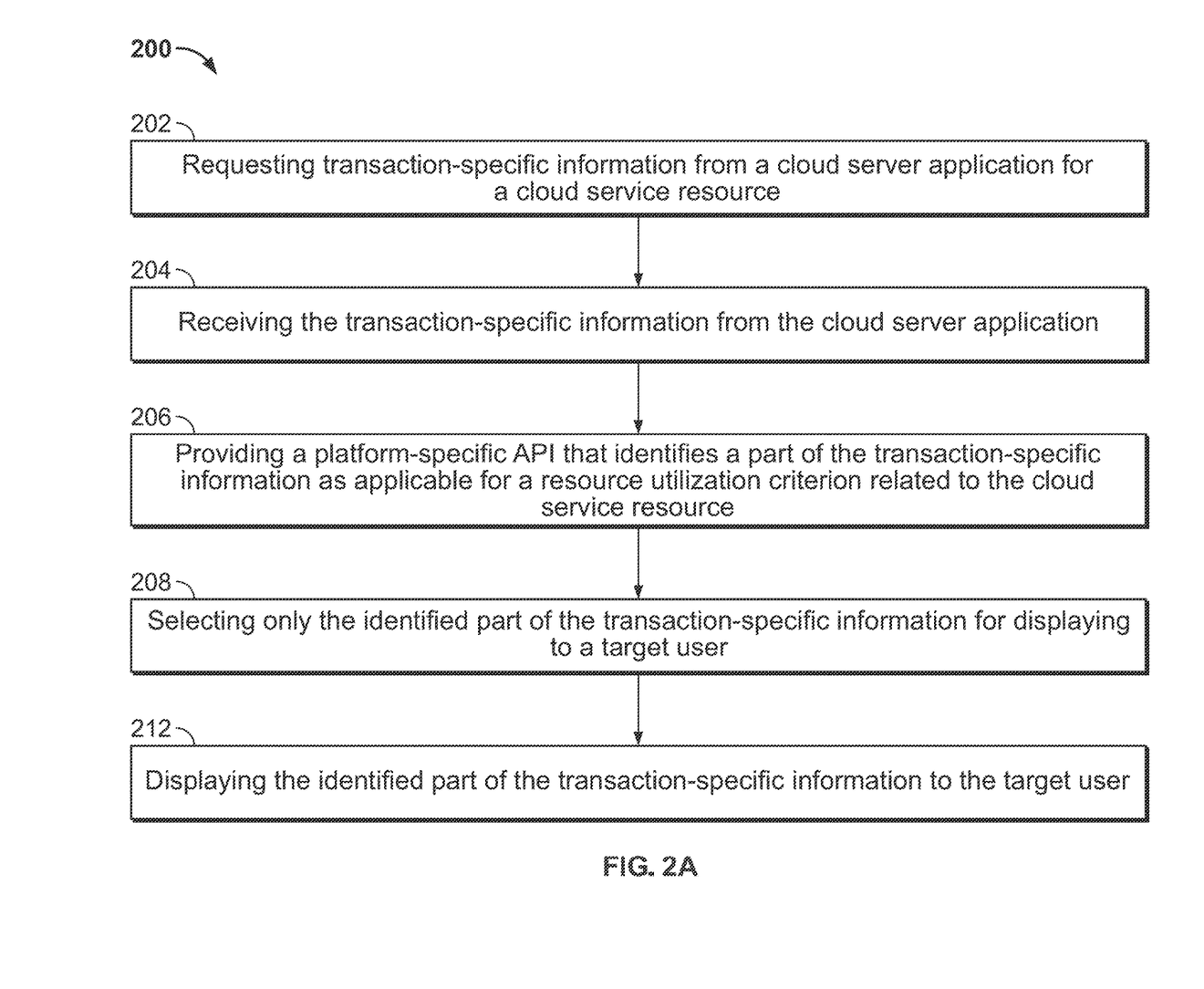
FIG. 2A is a flow diagram illustrating a method for visual planning and assignment of cloud service resources, in accordance with an embodiment of this disclosure.
Figure 3A:
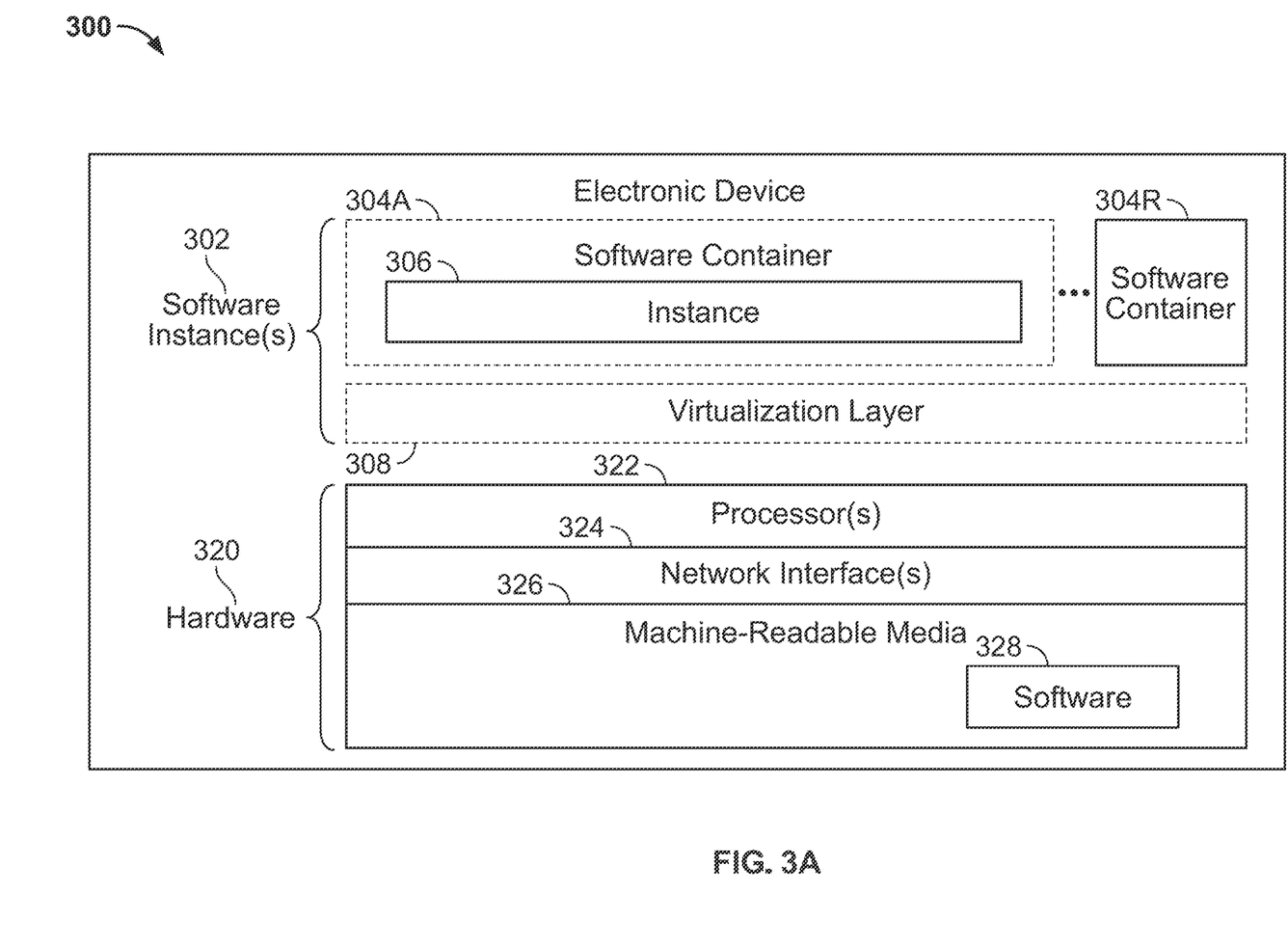
FIG. 3A is a block diagram illustrating an exemplary electronic device according to an example implementation.
Figure 3B:
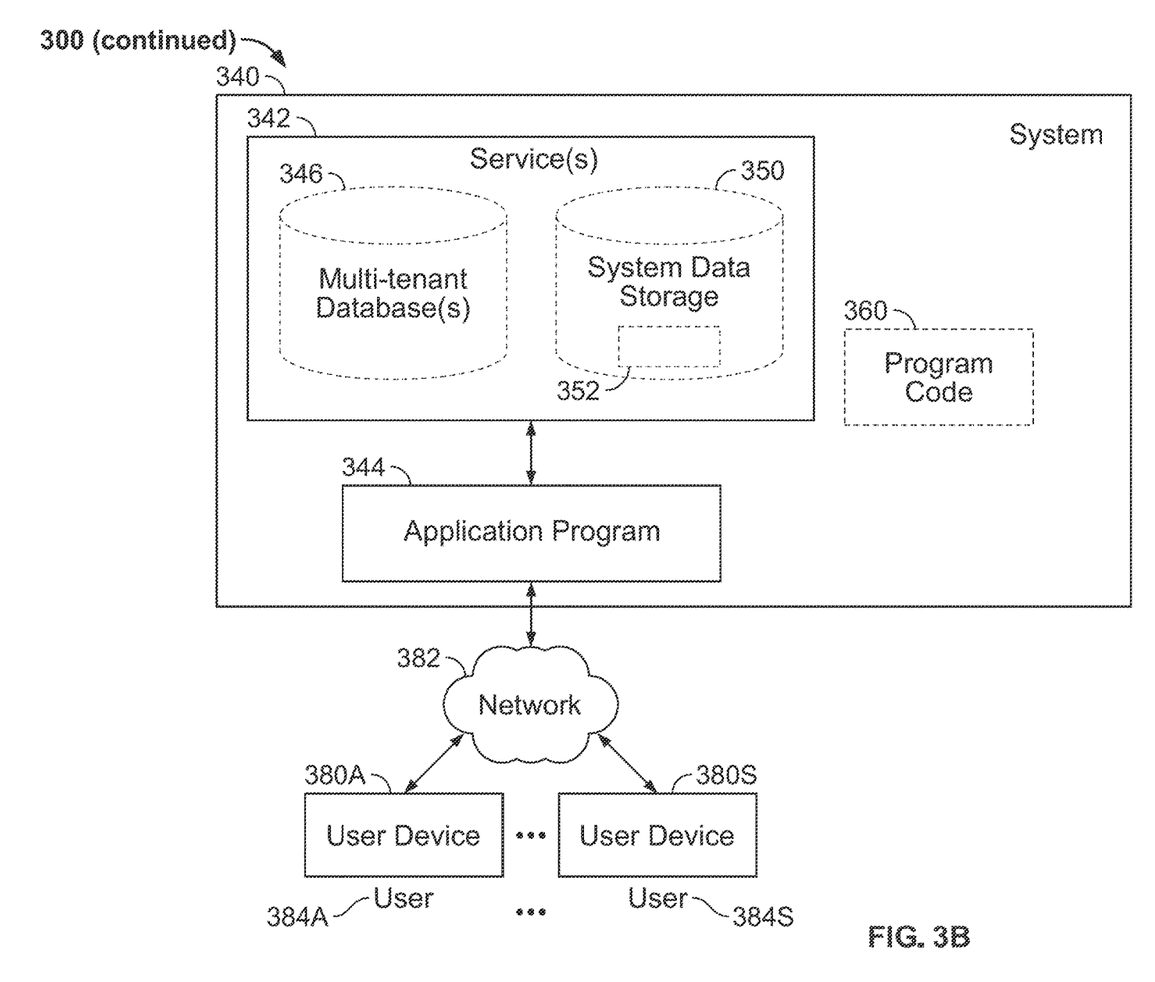
FIG. 3B is a block diagram of an exemplary deployment environment according to an example implementation.

FIG. 2A is a flow diagram illustrating a computer-implemented method 200 for providing user interfaces, as disclosed herein. The method 200 may be performed, for example, by a system as shown in FIG. 1C operating in conjunction with the hardware as shown in FIGS. 3A and 3B. The method 200 may include, as in step 202, requesting transaction-specific information for a cloud service resource offered by a cloud server application. At 204, the transaction-specific information is received from the cloud server application. At 206, a platform-specific application programming interface (API) is provided. The platform-specific API identifies a part of the transaction-specific information as applicable for a resource utilization criterion related to the cloud service resource. At 208, only the identified part of the transaction-specific information is selected for displaying to the target user. At 212, the identified part of the transaction-specific information is displayed to the target user.

Figure 2B:
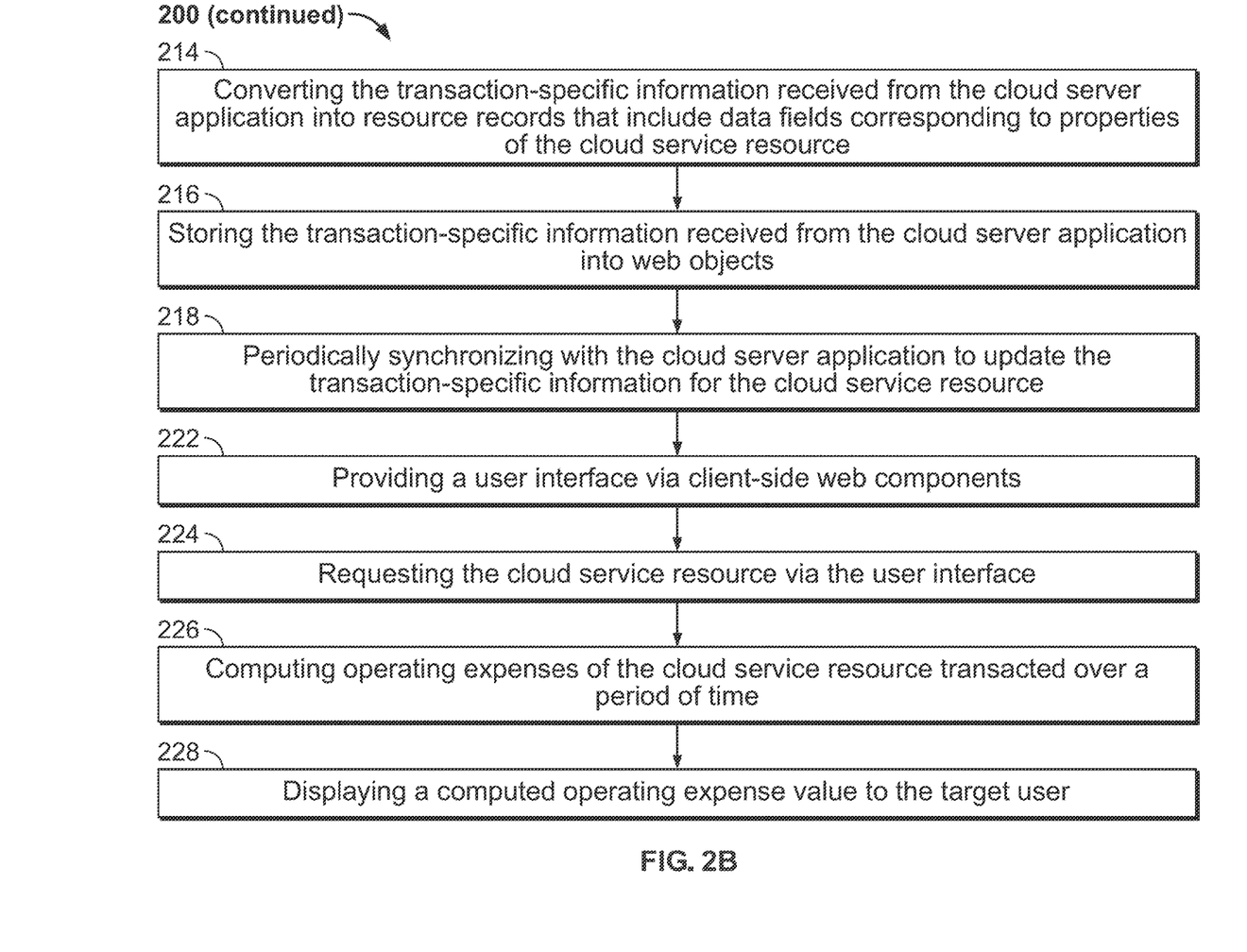
FIG. 2B is a flow diagram illustrating a method for visual planning and assignment of cloud service resources, in accordance with an embodiment of this disclosure.

FIG. 2B is a flow diagram illustrating a computer-implemented method 200 for providing user interfaces, as disclosed herein. FIG. 2B continues the method of FIG. 2A to show how the transaction-specific information and related information are processed at the end user's device, for example through a web browser and/or extension as previously disclosed. At 214, the transaction-specific information received from the cloud server application are converted into resource records. At 216, the transaction-specific information received from the cloud server application are stored into web objects. At 218, the transaction-specific information for the cloud service resource are maintained updated by periodically synchronizing with the cloud server application. At 222, a user interface is provided via client-side web components and the cloud service resource is requested via the user interface. The user interface provides options to the target user for selecting a desired cloud service resource and corresponding resource utilization criterion. At 226, operating expenses of the cloud service resource, as transacted over a period of time, are computed, based on the transaction-specific information. At 228, a computed operating expense value is displayed to the target user. Based on the target user's access privileges, the user may accept and approve or submit revisions or iterate through several available offers, as illustrated in the examples above, and select a particular pricing offer.

One or more parts of the above implementations may include software. Software is a general term whose meaning can range from part of the code and/or metadata of a single computer program to the entirety of multiple programs. A computer program (also referred to as a program) includes code and optionally data. Code (sometimes referred to as computer program code or program code) includes software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM). Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals— such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program: an event occurs such as a software or hardware interrupt, user input (e.g., a keystroke, a mouse-click, a voice command): a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios. "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices: examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (typically, though not necessarily an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices. The term "consumer" refers to another computer service that is running the reusable software components of the system of FIG. 1.

FIG. 3A is a block diagram illustrating an electronic device 300 according to some example implementations. FIG. 3A includes hardware 320 including a set of one or more processor(s) 322, a set of one or more network interfaces 324 (wireless and/or wired), and machine-readable media 326 having stored therein software 328 (which includes instructions executable by the set of one or more processor(s) 322). The machine-readable media 326 may include non-transitory and/or transitory machine-readable media. Each of the previously described clients and server components may be implemented in one or more electronic devices 300. In one implementation: 1) each of the clients is implemented in a separate one of the electronic devices 300 (e.g., in end user devices where the software 328 represents the software to implement clients to interface directly and/or indirectly with server components (e.g., software 328 represents a web browser, a native client, a portal, a command-line interface, and/or an application programming interface (API) based upon protocols such as Simple Object Access Protocol (SOAP), Representational State Transfer (REST), etc.)): 2) server components is implemented in a separate set of one or more of the electronic devices 300 (e.g., a set of one or more server devices where the software 328 represents the software to implement the framework for providing additional security to protected fields in protected views); and 3) in operation, the electronic devices implementing the clients and server components would be communicatively coupled (e.g., by a network) and would establish between them (or through one or more other layers and/or other services) connections for submitting requests to server components and returning responses to the clients. Other configurations of electronic devices may be used in other implementations (e.g., an implementation in which the client and server components are implemented on a single one of electronic device 300).

During operation, an instance of the software 328 (illustrated as instance 306 and referred to as a software instance: and in the more specific case of an application, as an application instance) is executed. In electronic devices that use compute virtualization, the set of one or more processor(s) 322 typically execute software to instantiate a virtualization layer 308 and one or more software container(s) 304A-304R (e.g., with operating system-level virtualization, the virtualization layer 308 may represent a container engine (such as Docker Engine by Docker, Inc. or rkt in Container Linux by Red Hat, Inc.) running on top of (or integrated into) an operating system, and it allows for the creation of multiple software containers 304A-304R (representing separate user space instances and also called virtualization engines, virtual private servers, or jails) that may each be used to execute a set of one or more applications: with full virtualization, the virtualization layer 308 represents a hypervisor (sometimes referred to as a virtual machine monitor (VMM)) or a hypervisor executing on top of a host operating system, and the software containers 304A-304R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 328 is executed within the software container 304A on the virtualization layer 308. In electronic devices where compute virtualization is not used, the instance 306 on top of a host operating system is executed on the "bare metal" electronic device 300. The instantiation of the instance 306, as well as the virtualization layer 308 and software containers 304A-304R if implemented, are collectively referred to as software instance(s) 302.

Alternative implementations of an electronic device may have numerous variations from that described above. For example, customized hardware and/or accelerators might also be used in an electronic device.

FIG. 3B is a block diagram of a deployment environment according to some example implementations. A system 340 includes hardware (e.g., a set of one or more server devices) and software to provide service(s) 342, including server components. In some implementations the system 340 is in one or more datacenter(s). These datacenter(s) may be: 1) first party datacenter(s), which are datacenter(s) owned and/or operated by the same entity that provides and/or operates some or all of the software that provides the service(s) 342: and/or 2) third-party datacenter(s), which are datacenter(s) owned and/or operated by one or more different entities than the entity that provides the service(s) 342 (e.g., the different entities may host some or all of the software provided and/or operated by the entity that provides the service(s) 342). For example, third-party datacenters may be owned and/or operated by entities providing public cloud services.

The system 340 is coupled to user devices 380A-380S over a network 382. The service(s) 342 may be on-demand services that are made available to one or more of the users 384A-384S working for one or more entities other than the entity which owns and/or operates the on-demand services (those users sometimes referred to as outside users) so that those entities need not be concerned with building and/or maintaining a system, but instead may make use of the service(s) 342 when needed (e.g., when needed by the users 384A-384S). The service(s) 342 may communicate with each other and/or with one or more of the user devices 380A-380S via one or more APIs (e.g., a REST API). In some implementations, the user devices 380A-380S are operated by users 384A-384S, and each may be operated as a client device and/or a server device. In some implementations, one or more of the user devices 380A-380S are separate ones of the electronic device 300 or include one or more features of the electronic device 300.

In some implementations, the system 340 is any generic network interface management system that uses web interfaces and includes server application components, client application components and a browser extension. The system and method provide for authenticating the end user via a browser extension that needs to be available in the intended user's web browser. The input to the system and method is the information about the views and its specific fields or any other part that is rendered and need to be protected, as provided by the application owner. Typical generic examples are Java clients and applications, Python based frameworks, libraries for client applications implementing the logic described above.

In some implementations, the system 340) is any generic network interface management system that uses web interfaces and includes server application components, client application components and a browser extension. The system and method provide for authenticating the end user via a browser extension that needs to be available in the intended user's web browser. The input to the system and method is the information about the views and its specific fields or any other part that is rendered and need to be protected, as provided by the application owner. Typical generic examples are Java clients and applications, Python based frameworks, libraries for client applications implementing the logic described above.

Network 382 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a 4th generation wireless protocol (4G) (e.g., the Long Term Evolution (LTE) standard. LTE Advanced. LTE Advanced Pro), a fifth generation wireless protocol (5G), and/or similar wired and/or wireless protocols, and may include one or more intermediary devices for routing data between the system 340) and the user devices 380A-380S.

Each user device 380A-380S (such as a desktop personal computer, workstation, laptop. Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 340. For example, the user interface device can be used to access data and applications hosted by system 340, and to perform searches on stored data, and otherwise allow one or more of users 384A-384S to interact with various GUI pages that may be presented to the one or more of users 384A-384S. User devices 380A-380S might communicate with system 340 using TCP/IP (Transfer Control Protocol and Internet Protocol) and, at a higher network level, use other networking protocols to communicate, such as Hypertext Transfer Protocol (HTTP). File Transfer Protocol (FTP). Andrew File System (AFS). Wireless Application Protocol (WAP). Network File System (NFS), an application program interface (API) based upon protocols such as Simple Object Access Protocol (SOAP). Representational State Transfer (REST), etc. In an example where HTTP is used, one or more user devices 380A-380S might include an HTTP client, commonly referred to as a "browser," for sending and receiving HTTP messages to and from server(s) of system 340, thus allowing users 384A-384S of the user devices 380A-380S to access, process and view information, pages and applications available to it from system 340 over network 382.

In the above description, numerous specific details such as resource partitioning/sharing/duplication implementations, types and interrelationships of system components, and logic partitioning/integration choices are set forth in order to provide a more thorough understanding. Embodiments disclosed herein may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is illustrative and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A computer-implemented method for providing user interfaces, the method comprising:
   requesting, from a single cloud server application, transaction-specific information for a cloud service resource offered by the single cloud server application, the requesting causing the single cloud server application to send the transaction-specific information, wherein the transaction-specific information indicates the resources required to access the cloud service resource;
   receiving the transaction-specific information from the cloud server application;
   converting, at a processor, the transaction-specific information received from the single cloud server application into resource records comprising data fields corresponding to properties of the cloud service resource, wherein the properties comprise a cloud service provider, a cloud service category, a resource item number, and a memory usage specification of the resource;
   periodically synchronizing, at the processor, with the single cloud server application to update the transaction-specific information for the cloud service resource;
   providing a platform-specific application programming interface (API) configured for and that provides functionality only for the single cloud server application, wherein the platform-specific API identifies a part of the transaction-specific information as applicable for a resource utilization criterion related to the cloud service resource, wherein the resource utilization criterion comprises an availability in a geographical region, a resource size preference of a target user, and a resource category preference of the target user;
   selecting only the identified part of the transaction-specific information, and displaying the identified part of the transaction-specific information to the target user; and
   receiving a request for the cloud service resource, and provisioning the cloud service resource and corresponding resource utilization criterion based on the received request.

2. The method of claim 1, further comprising storing the transaction-specific information received from the single cloud server application into web objects that store the transaction-specific information.

3. The method of claim 1, further comprising computing operating expenses of the cloud service resource transacted over a predetermined period of time, based on the transaction-specific information and displaying a computed operating expense value to the target user.

4. A system for providing graphical user interfaces, the system comprising:
   a computer processor configured to run a web client application digitally connected with the computer processor, the web client application comprising:
      resource records comprising data fields corresponding to properties of a cloud service resource offered by a single cloud server application;
      web objects that store a transaction-specific information for the cloud service resource;
   a non-transitory machine-readable storage medium that provides instructions that, if executed by the processor, are configurable to cause the apparatus to perform operations comprising:
      requesting, from the single cloud server application, transaction-specific information for a cloud service resource offered by the cloud server application, the requesting causing the single cloud server application to send the transaction-specific information, wherein the transaction-specific information indicates the resources required to access the cloud service resource;

receiving the transaction-specific information from the single cloud server application;

converting the transaction-specific information received from the single cloud server application into resource records comprising data fields corresponding to properties of the cloud service resource, wherein the properties comprise a cloud service provider, a cloud service category, a resource item number, and a memory usage specification of the resource;

periodically synchronizing with the single cloud server application to update the transaction-specific information for the cloud service resource;

providing a platform-specific application programming interface (API) configured for and that provides functionality only for the single cloud server application, wherein the platform-specific API identifies a part of the transaction-specific information as applicable for a resource utilization criterion related to the cloud service resource, wherein the resource utilization criterion comprises an availability in a geographical region, a resource size preference of a target user, and a resource category preference of the target user;

selecting only the identified part of the transaction-specific information for displaying to the target user;

displaying the identified part of the transaction-specific information to the target user; and receiving a request for the cloud service resource, and provisioning the cloud service resource and corresponding resource utilization criterion based on the received request.

5. The system of claim 4, further comprising storing the transaction-specific information received from the single cloud server application into web objects that store the transaction-specific information.

6. The system of claim 4, further comprising computing operating expenses of the cloud service resource transacted over a predetermined period of time, based on the transaction-specific information and displaying a computed operating expense value to the target user.

7. A non-transitory machine-readable storage medium that provides instructions that, if executed by a processor, are configurable to cause said processor to perform operations comprising:

requesting, from a single cloud server application, transaction-specific information for a cloud service resource offered by the single cloud server application, the requesting causing the single cloud server application to send the transaction-specific information, wherein the transaction-specific information indicates the resources required to access the cloud service resource;

receiving the transaction-specific information from the single cloud server application;

converting the transaction-specific information received from the single cloud server application into resource records comprising data fields corresponding to properties of the cloud service resource, wherein the properties comprise a cloud service provider, a cloud service category, a resource item number, and a memory usage specification of the resource;

periodically synchronizing with the single cloud server application to update the transaction-specific information for the cloud service resource;

providing a platform-specific application programming interface (API) configured for and that provides functionality only for the single cloud server application, wherein the platform-specific API identifies a part of the transaction-specific information as applicable for a resource utilization criterion related to the cloud service resource, wherein the resource utilization criterion comprises an availability in a geographical region, a resource size preference of a target user, and a resource category preference of the target user;

selecting only the identified part of the transaction-specific information for displaying to the target user;

displaying the identified part of the transaction-specific information to the target user; and receiving a request for the cloud service resource, and provisioning the cloud service resource and corresponding resource utilization criterion based on the received request.

8. The non-transitory machine-readable storage medium of claim 7, further comprising storing the transaction-specific information received from the single cloud server application into web objects that store the transaction-specific information.

9. The non-transitory machine-readable storage medium of claim 7, further comprising computing operating expenses of the cloud service resource transacted over a predetermined period of time, based on the transaction-specific information and displaying a computed operating expense value to the target user.

* * * * *